United States Patent [19]
Auer

[11] Patent Number: 4,557,091
[45] Date of Patent: Dec. 10, 1985

[54] EXTRUDED STRUCTURAL SYSTEM

[75] Inventor: Jay R. Auer, Dunwoody, Ga.

[73] Assignee: Corflex International, Inc., Warren, Ohio

[21] Appl. No.: 694,185

[22] Filed: Mar. 1, 1985

Related U.S. Application Data

[63] Continuation of Ser. No. 347,416, Feb. 10, 1982, abandoned.

[51] Int. Cl.[4] .............................................. E04B 2/32
[52] U.S. Cl. .................................... 52/282; 52/595
[58] Field of Search .......... 52/282, 595, 582, 586–588, 52/591, 594, 729, 785, 807

[56] References Cited

U.S. PATENT DOCUMENTS

| | | | |
|---|---|---|---|
| 1,826,114 | 10/1931 | Young | 52/807 |
| 2,017,441 | 10/1935 | Kotrbaty | 52/729 |
| 2,079,635 | 5/1937 | Sharp | 52/282 |
| 2,106,179 | 1/1938 | Kotrbaty | 52/250 |
| 2,175,579 | 10/1939 | Stratton | 52/594 |
| 2,257,001 | 9/1941 | Davis | 52/573 |
| 3,026,977 | 3/1962 | Pollock et al. | |
| 3,186,561 | 6/1965 | Strassle | 52/282 |
| 3,216,538 | 11/1965 | Miller | 52/582 |
| 3,310,926 | 5/1967 | Brandreth et al. | 52/582 |
| 3,349,533 | 10/1967 | Gregoire | 52/582 |
| 3,359,700 | 12/1967 | Birum | 52/785 |
| 3,452,501 | 7/1969 | Zimmer et al. | 52/282 |
| 3,738,083 | 6/1973 | Shimano | 52/582 |
| 3,807,100 | 4/1974 | Kuss | |
| 3,820,299 | 6/1974 | Verholt | 52/282 |
| 3,866,381 | 2/1975 | Eschbach et al. | 52/582 |
| 3,886,706 | 6/1975 | Baker | 52/807 |
| 3,992,834 | 11/1976 | Valenzano | 52/594 |
| 3,992,839 | 11/1976 | La Borde | 52/588 |
| 4,019,298 | 4/1977 | Johnson | 52/594 |
| 4,067,161 | 1/1978 | Rensch | 52/282 |

FOREIGN PATENT DOCUMENTS

| | | | |
|---|---|---|---|
| 0772851 | 12/1967 | Canada | 52/588 |
| 2222337 | 11/1973 | Fed. Rep. of Germany | 52/282 |
| 2643270 | 3/1978 | Fed. Rep. of Germany | 52/282 |
| 2752286 | 5/1979 | Fed. Rep. of Germany | 52/588 |
| 2948971 | 6/1981 | Fed. Rep. of Germany | 52/582 |
| 878984 | 11/1942 | France | 52/785 |
| 2274748 | 1/1976 | France | 52/582 |
| 0021895 | of 1911 | United Kingdom | 52/729 |
| 558166 | 12/1943 | United Kingdom . | |
| 1094712 | 12/1967 | United Kingdom . | |
| 1098681 | 1/1968 | United Kingdom . | |
| 2035409 | 6/1980 | United Kingdom . | |
| 2058871 | 4/1981 | United Kingdom . | |
| 2082645 | 3/1982 | United Kingdom . | |

OTHER PUBLICATIONS

PCT Application Publication WO 80/01185 dated Jun. 12, 1980, 25 pages spec., 8 pages of dwgs.
Advertising brochure of The Pultrusions Corporation.

*Primary Examiner*—James L. Ridgill, Jr.
*Attorney, Agent, or Firm*—William H. Needle

[57] ABSTRACT

A structural system including a panel having a pair of parallel planar outer walls, reinforcing ribs joining the outer walls with reinforced shoulders at the intersection of the ribs with the walls, and a panel connecting member for joining the panel to an adjacent panel by slidably engaging an interlocking panel joining member. The panel connecting member includes a head portion and a neck portion which form a pair of opposed keyways and permits interlocking with the interlocking lips of variously configured panel joining members. A variety of interlocking panel joining members allow assembly of the structural panels in end-to-end configurations, T-intersections, cross-intersections and other configurations to form structural systems. Also disclosed are interlocking end trim members, bolted interlock members and edge insert members which may be used to assemble a complete structure.

1 Claim, 25 Drawing Figures

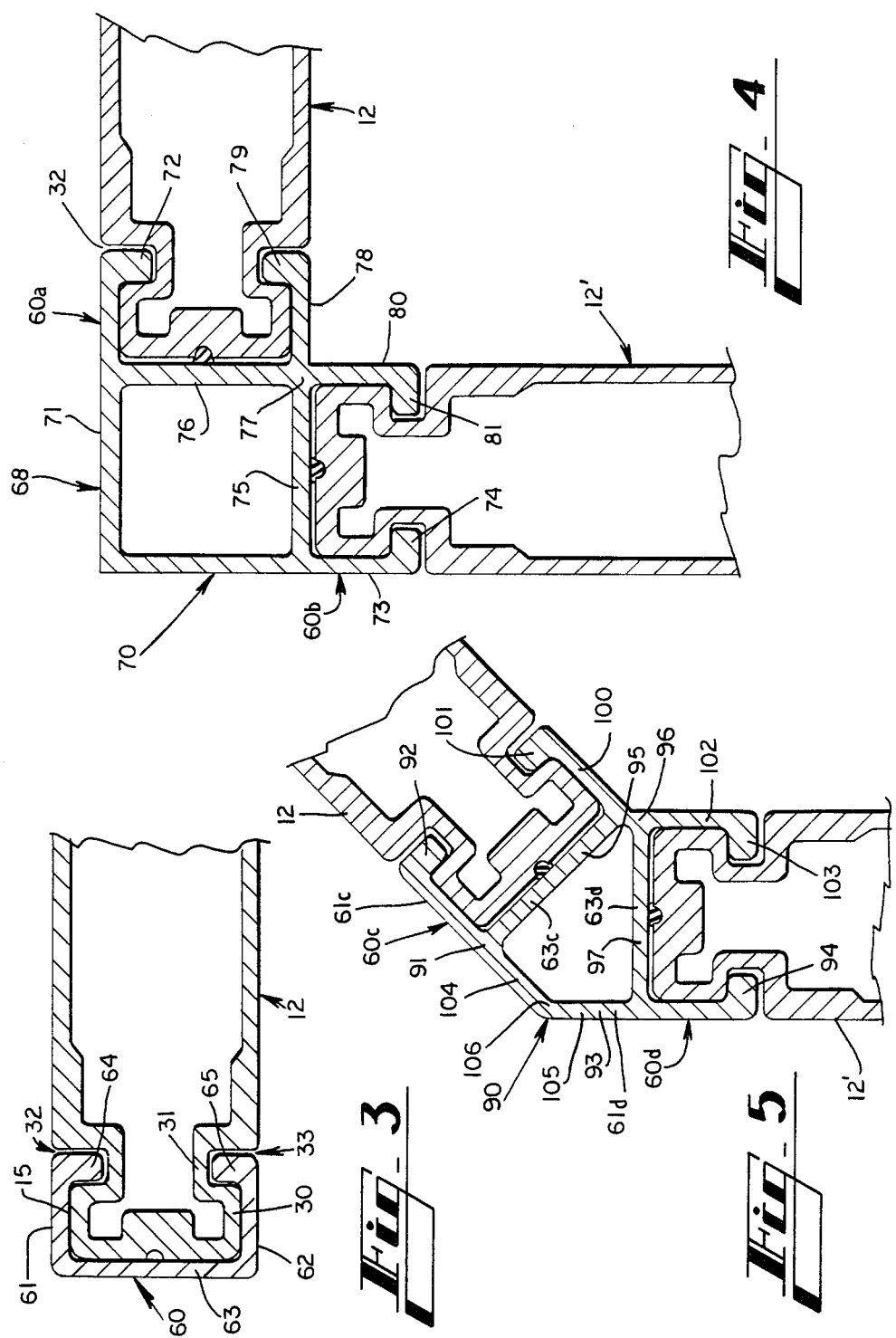

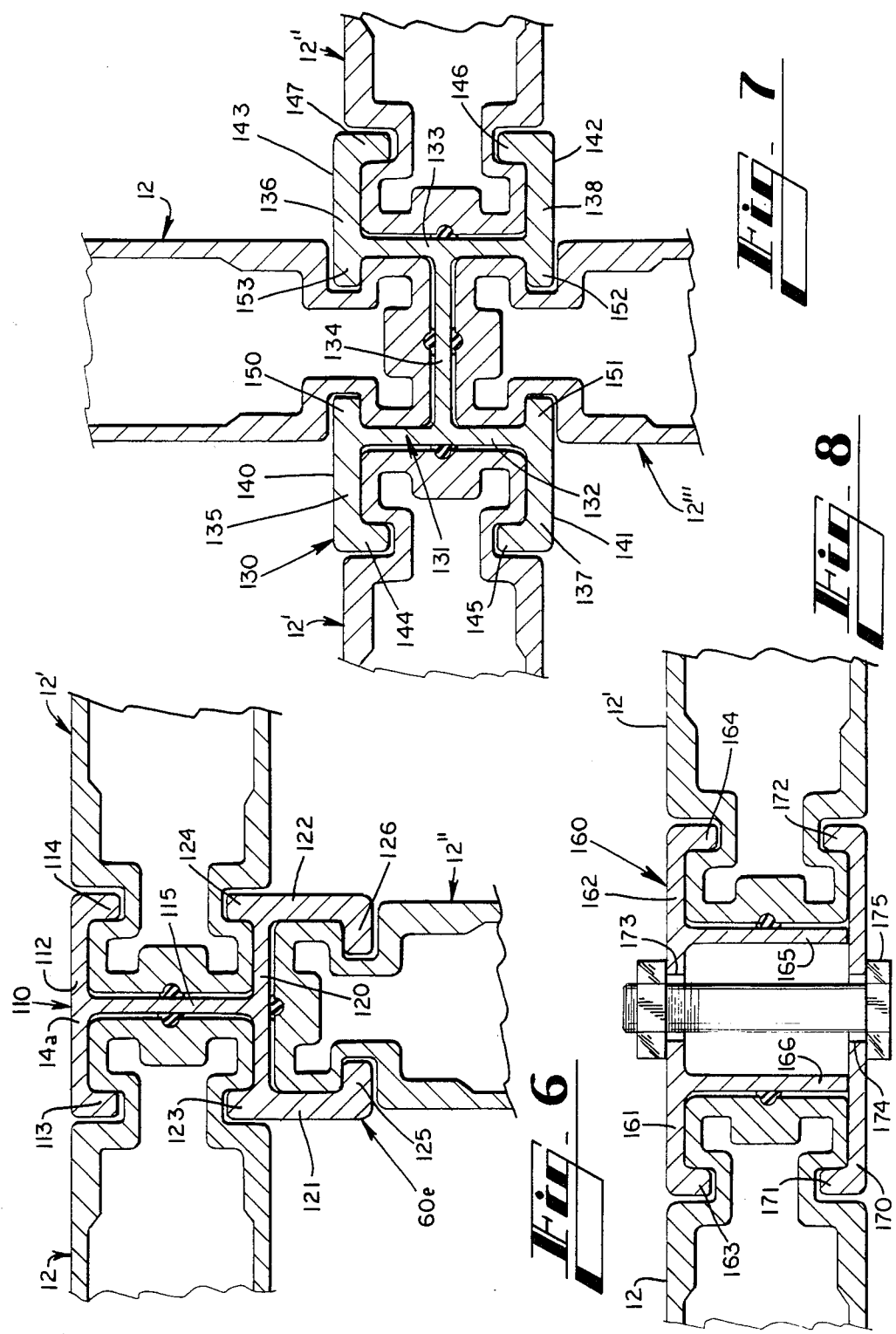

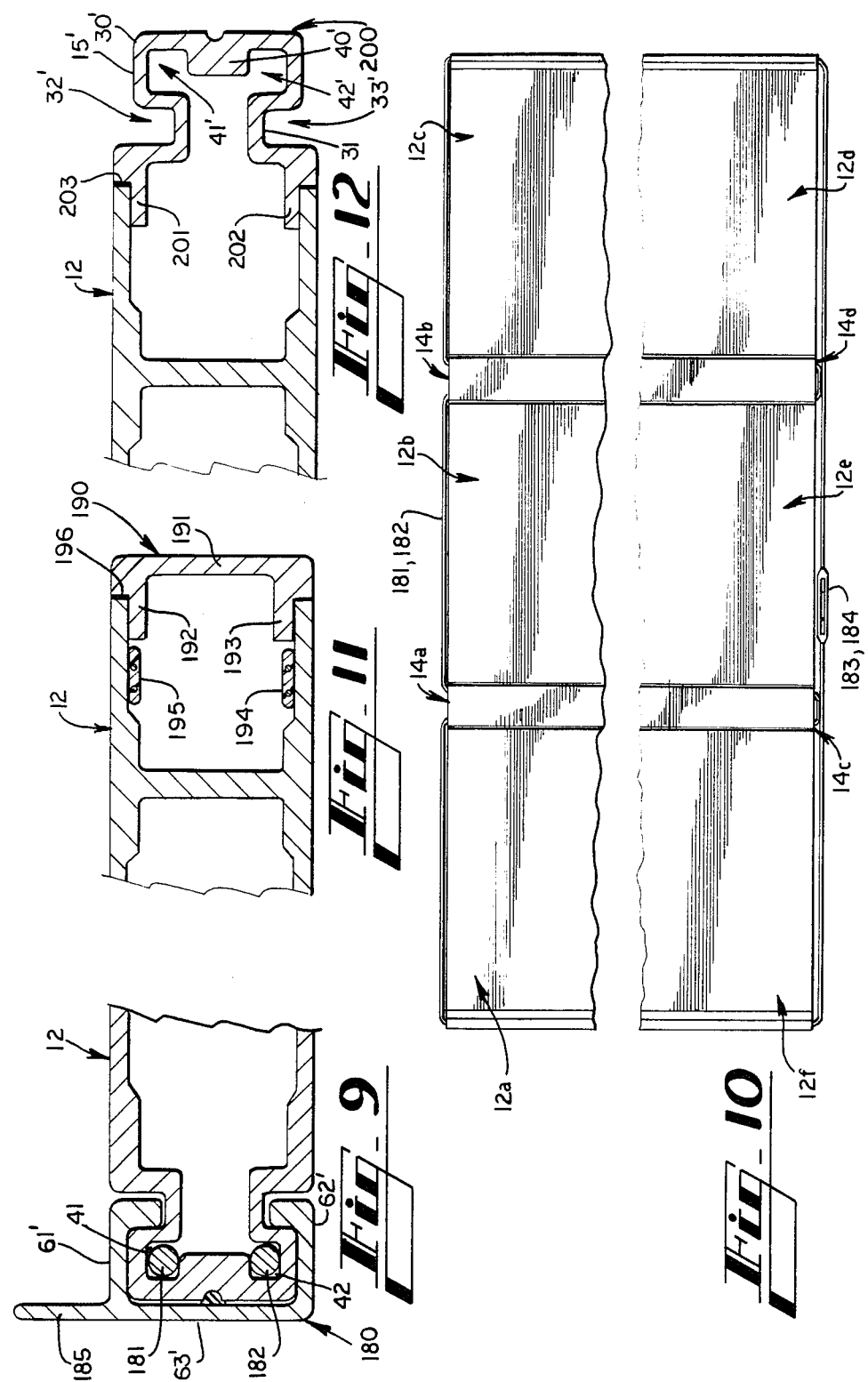

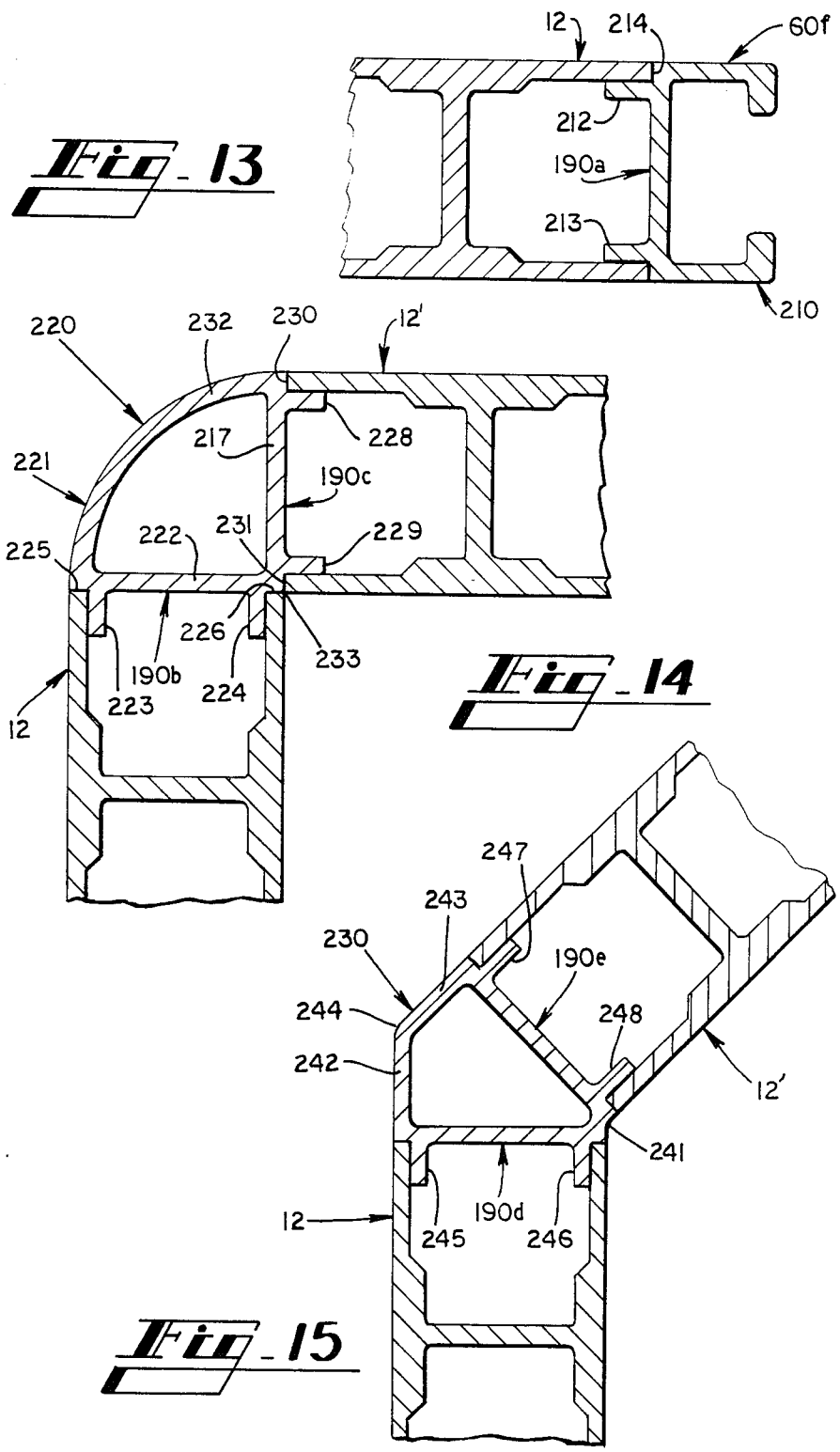

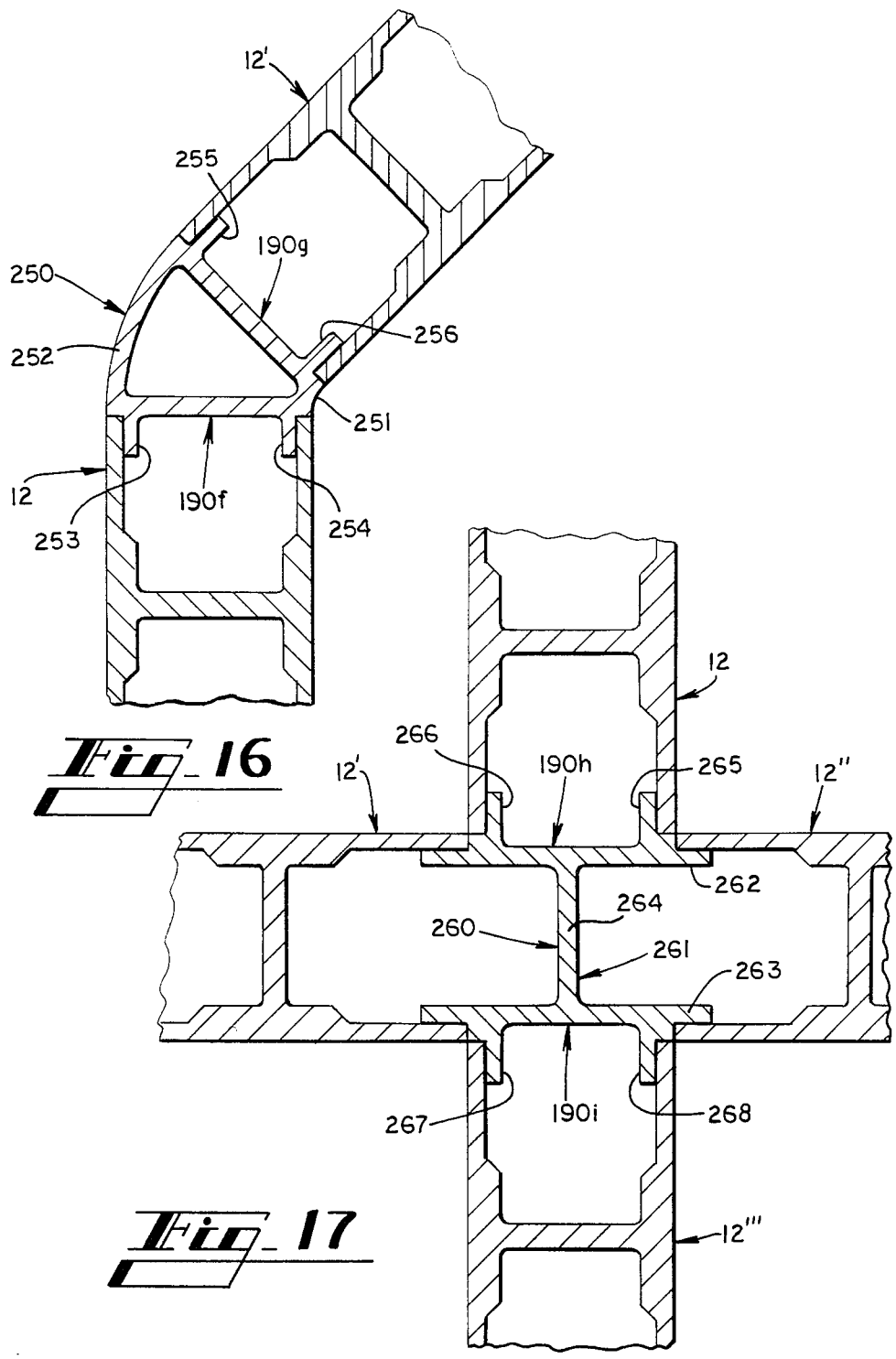

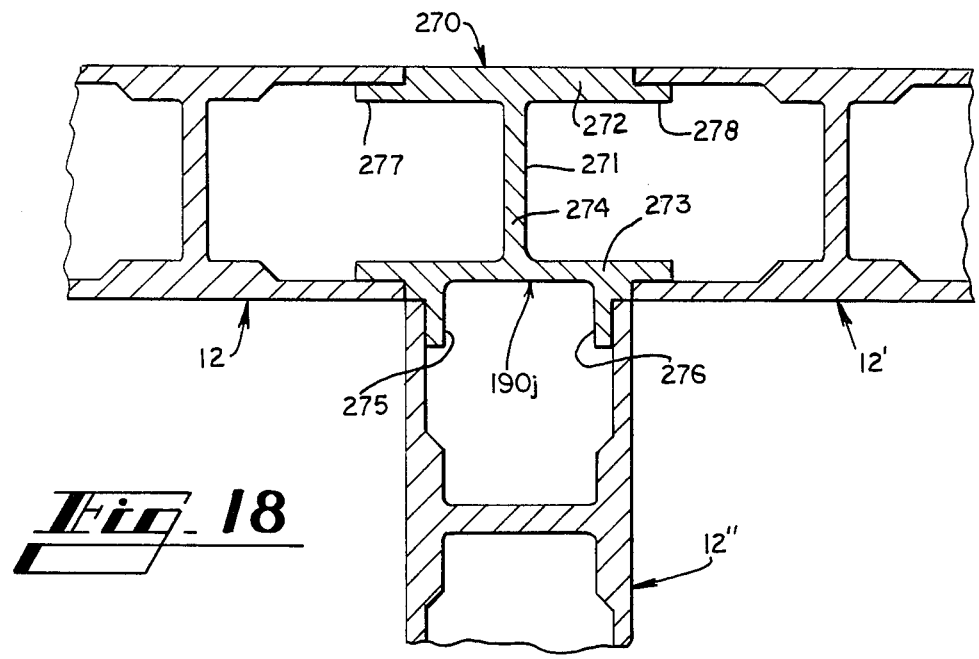
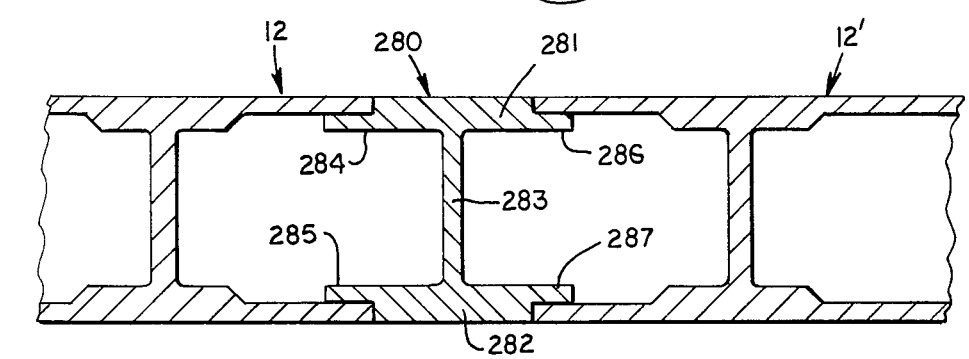
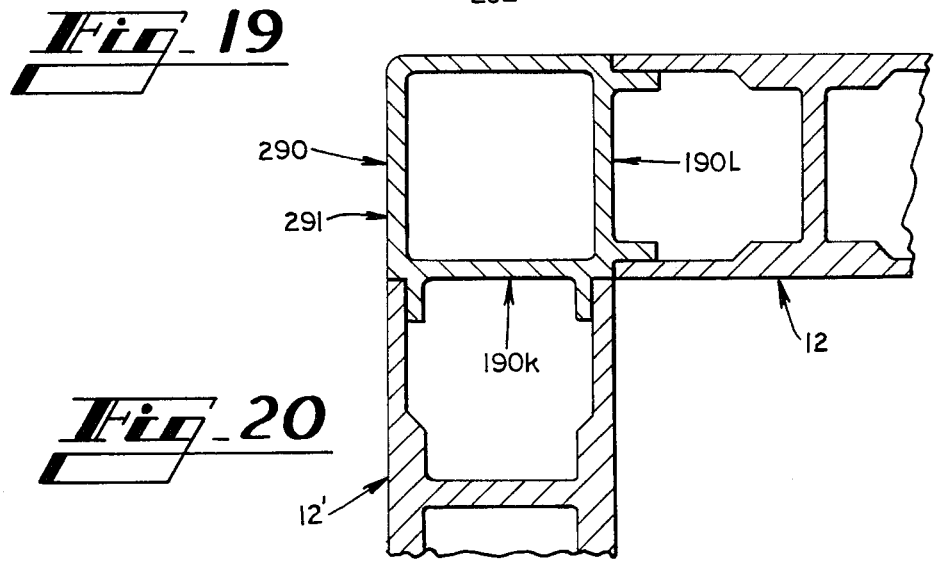

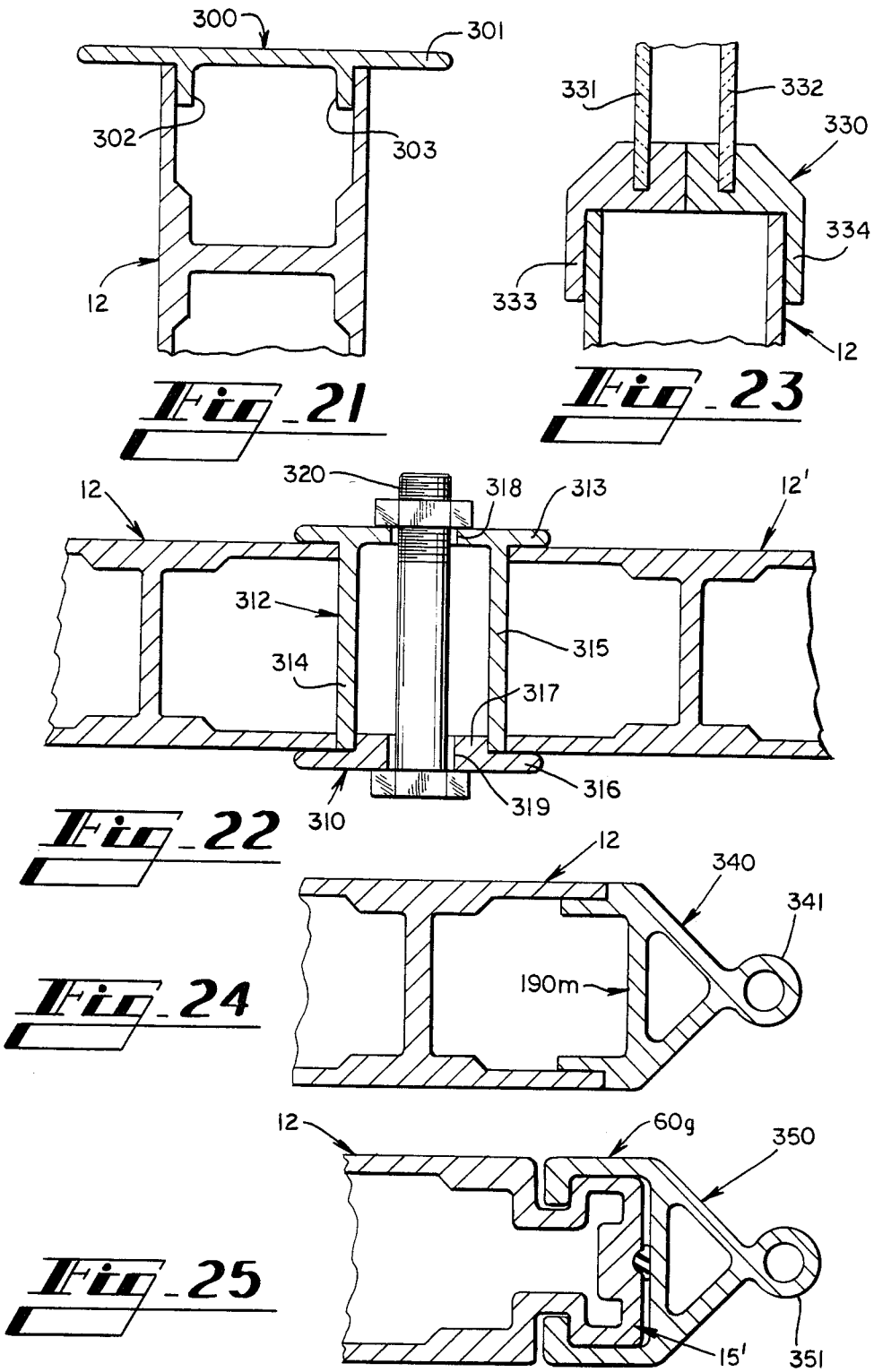

4,557,091

EXTRUDED STRUCTURAL SYSTEM

This is a continuation of application Ser. No. 347,416 filed Feb. 10, 1982 now abandoned.

BACKGROUND

1. Field of the Invention

The present invention relates generally to structural systems, and specifically relates to extruded structural systems which include extruded structural panels and extruded panel joining members for assembling a structural system with a plurality of panels.

2. Description of the Prior Art

Extruded structural system components are known in the art and have been fabricated for such widely varying purposes such as window mullions, doors, outer belt panels for buses, fluid flumes, ducting, cable trays, and the like. Hollow extruded structural panels have been made for upward-acting doors for refrigerated trucks to replace bonded assemblies of metal or wood frames with external sheet skins. Such structural panels are usually constructed with tongue and groove edges which allow relative motion between panels.

There have not heretofore been constructed extruded structural panel components which rigidly fasten together in an interlocking fashion so to facilitate construction of immovable structures such as walls, floors, and the like. Moreover, prior art extruded structural components, although sometimes made with integral reinforcing ribs, have not exhibited sufficient longitudinal and transverse strengths to be seriously considered for structural applications requiring load-bearing capability.

SUMMARY OF THE INVENTION

The present invention provides an improved extruded structural system which includes a structural panel having a pair of planar outer walls, at least one reinforcing rib joining the outer walls, a reinforcing shoulder formed at each intersection of a rib with the outer walls, and panel connecting means on the outer edge of the panel which allows joining the panel to an adjacent panel in a rigid structure. A preferred embodiment of the panel connecting means comprises a panel connecting member which extends outwardly from the walls along the longitudinal edge in a head portion and a neck portion. The head and neck portions slidably engage and interlock with mating panel joining members which allow assembly of several panels into structures. Variously configured panel joining members allow the panels to be assembled edge-to-edge in co-planar, orthogonal, angular, cross, and T-shaped intersections.

The structural system disclosed herein is extremely versatile and possesses unusual strength because of the unique features of the structural panel. The structural panel demonstrates a remarkable resistance to compressive and shear forces due to the unique reinforcing ribs which are integrally formed with the panel. The unique interlocking panel connecting members, also integrally formed along each longitudinal edge of the panel, further contribute to the overall strength and versatility of any structure built using the system.

Structural assemblies made with the preferred embodiment of the present invention may be successfully employed in such diverse applications as electrical utility cooling tower louvres, floating covers for oil and other petroleum product storage tanks, anti-corrosive structures for use in harsh chemical plant environments, computer room flooring, self-supporting conduit for electrical and utility cabling, energy efficient insulated building siding for storage shelters and refrigerated enclosures, air intake housings and ducting, architectural room dividers, and heavy equipment hoods and enclosures.

A superior structural system can be made if the preferred embodiment is extruded from fiberglass reinforced plastic. Such a system will be lighter than aluminum yet nearly as rigid, and will be a good insulator of both heat and electricity. Moreover, the system will not rust, rot, corrode, or oxidize, and will be resistant to most corrosive environments.

The preferred embodiment presents a hollow cross-section which may be filled with foam or insulation in order to provide additional fire resistance, thermal insulation, or floatability. Moreover, a cable may be routed through the cross-section and used to lash together several panels. A sealing o-ring may be placed between the panel and panel joining members so as to provide a substantially water-tight structure.

Accordingly, it is an object of the present invention to provide an improved structural system which includes an improved structural panel and means for assembling several panels into a construction.

It is another object of the present invention to provide an improved structural system whose components are unitary and integrally formed.

It is another object of the present invention to provide for use in a structural system an improved structural panel having means affixed to the outer longitudinal edges of the panel for connection of the panels to other like panels in a variety of different configurations such as corners, T-intersections, angled corners, cross-intersections, and the like.

It is another object of the present invention to provide for use in a structural system an improved structural panel having panel connecting members affixed to the ends of the panels which are formed of a neck portion and a head portion which allows interlocking the panel with various differently configured panel joining members such as corner connectors, T-intersection connectors, angled corner connectors, cross-intersection connectors, and the like.

It is another object of the present invention to provide for use in a structural system an improved structural panel having a pair of outer walls separated by at least one reinforcing rib joining the walls having reinforcing shoulders for providing improved resistance to shear and compressive forces.

It is another object of the present invention to provide an improved structural system which includes means for slidably engaging a series of structural panels in various configurations including joining panels end to end, joining panels in a corner and angular intersections, joining panels in a T-shaped intersection, joining panels in a cross intersection, and joining panels by means of a bolted interlock when it is not feasible to slidably engage a panel joining interlock member.

It is another object of the present invention to provide an improved structural system having a flush exterior appearance at the joints between structural panels and the interlocking panel joining members which are used to join the outer edges of the panels.

It is another object of the present invention to provide an improved structural system which includes a plurality of structural panels having channels formed in the outer edges for receiving reinforcing cable along the length of the panel.

It is another object of the present invention to provide an improved structural system which includes sealing means between structural panels and interlocking panel joining members so as to facilitate assembly of a structure which is substantially water- or fluid-tight.

It is another object of the present invention to provide an improved structural system which includes structural panels joined by interlocking panel joining members which slidably engage and interlock with the structural panels so as to form an extremely strong structural joint.

It is another object of the present invention to provide an improved structural system which presents a hollow cross-section which may either be filled with foam, insulation, or the like so that the structural system possesses fire resistance, high electrical insulation properties, floatability, thermal insulation, or may alternatively be used hollow as conduit for electrical cabling or other utilities.

It is another object of the present invention to provide an improved structural system which possesses extremely high tensile strength, compressive strength, flexural strength, bearing stress resistance, interlaminar shear resistance, and punch shear resistance by virtue of its unitary and reinforced cross-section.

It is another object of the present invention to provide an extruded structural system which possesses extremely high strengths in both longitudinal and transverse directions, and thus may advantageously be used to construct load-bearing floors, walls, or ceilings.

It is another object of the present invention to provide an improved extruded fiberglass-reinforced plastic structural system which is extremely strong, lightweight, and substantially impervious to corrosive environments.

It is another object of the present invention to provide an improved structural system in which heating means may be employed so as to maintain the entire structural system at a predetermined temperature for heating or cooling a structure in which the structural system is employed.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3 is a cross-sectional view of a panel end trim member which may be used with the panel shown in FIG. 1.

FIG. 4 is a cross-sectional view of a square corner interlocking panel joining member.

FIG. 5 is a cross-sectional view of an angled interlocked panel joining member.

FIG. 6 is a cross-sectional view of a T-intersection interlocking panel joining member.

FIG. 7 is a cross-sectional view of an interlocking panel joining member which may be used to join four panels in a cross-intersection.

FIG. 8 is a cross-sectional view of a bolted interlocking panel joining member.

FIG. 9 is a cross-sectional view of an interlocking panel end trim member which includes a mounting lip and further shows how reinforcing cables may be used in the present invention.

FIG. 10 shows how several panels may be lashed together with cables.

FIG. 11 is a cross-sectional view of an edge trim insert member for the transverse or cut longitudinal edge of a panel.

FIG. 12 is a cross-sectional view of an edge interlocking insert member for the transverse or cut longitudinal edge of a panel.

FIG. 13 is a cross-sectional view of a C-shaped edge panel end insert member for the transverse or cut longitudinal edge of a panel.

FIG. 14 is a cross-sectional view of a rounded corner edge panel end insert member.

FIG. 15 is a cross-sectional view of an angled corner edge panel end insert member.

FIG. 16 is a cross-sectional view of a rounded angled corner edge panel end insert member.

FIG. 17 is a cross-sectional view of an edge panel insert member which may be used to join in a cross-intersection the edges of four panels.

FIG. 18 is a cross-sectional view of an edge panel insert member which may be used to join in a T-intersection the edges three panels.

FIG. 19 is a cross-sectional view of a double edge panel end insert member.

FIG. 20 is a cross-sectional view of a square corner edge panel end insert member.

FIG. 21 is a cross-sectional view of a double lip edge panel end insert member.

FIG. 22 is a cross-sectional view of a bolted edge panel joining member.

FIG. 23 is a cross-sectional view of a double pane window mullion member which may be used to support panes of glass in a construction.

FIG. 24 is a cross-sectional view of a hinge edge panel end insert member.

FIG. 25 is a hinge interlocking panel end member.

DETAILED DESCRIPTION OF THE PREFERRED EMBODIMENT

Figures 1, 2:
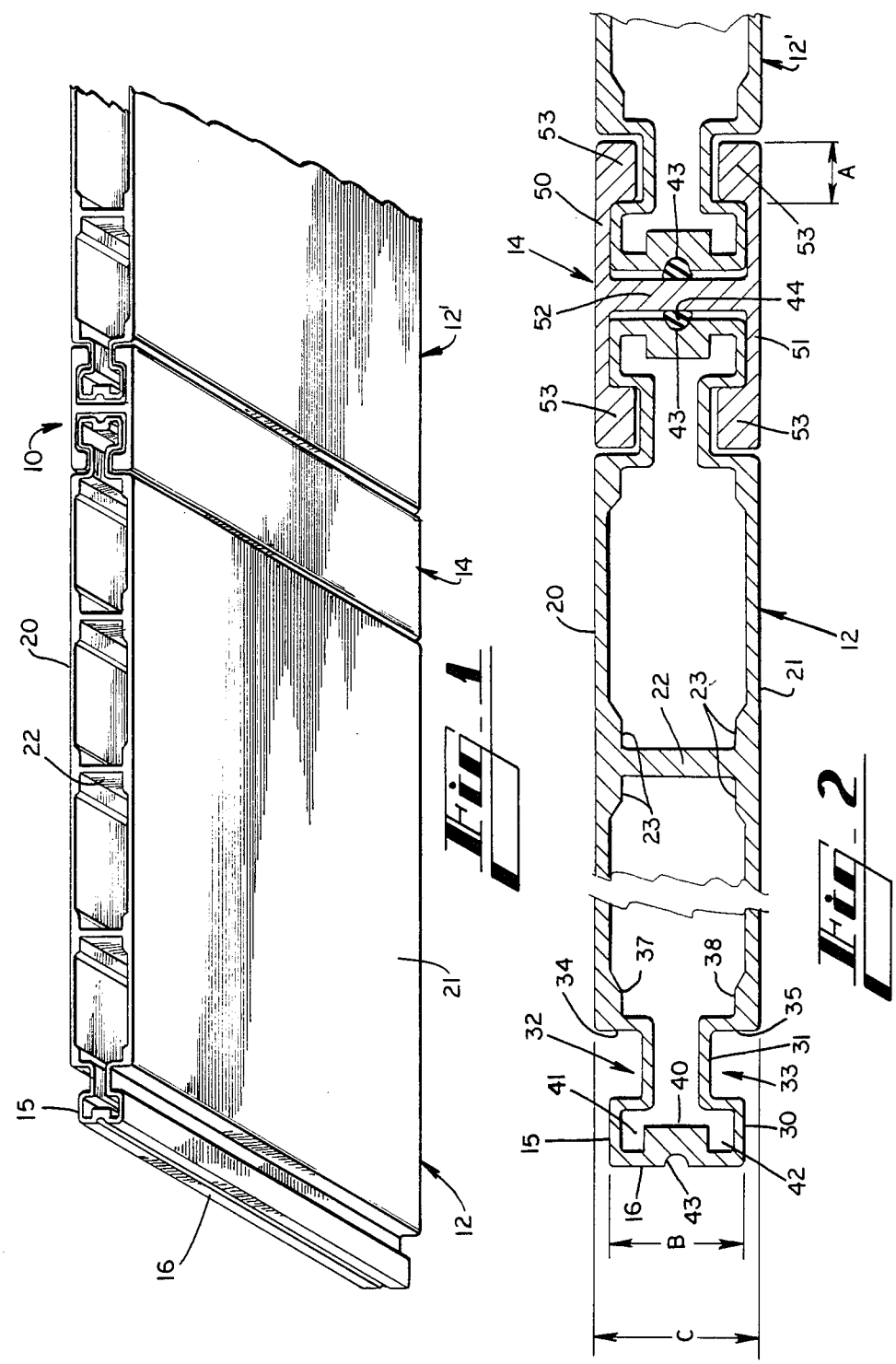
FIG. 1 shows a perspective view of a preferred embodiment of the improved structural system of the present invention, which includes an improved structural panel.
FIG. 2 is a detailed cross-sectional view of the system shown in FIG. 1.

Referring now to the drawings, in which like numerals indicate like elements throughout the several views, FIG. 1 shows a preferred embodiment of an extruded structural system 10 according to the present invention in cross-section. The preferred embodiment includes a unitary, integrally formed structural panel 12 which is joined to a similar panel 12' by means of an integrally formed interlocking coplanar panel joining member 14. A panel connecting member 15 is integrally formed at each end of panel 12 and runs along an outer longitudinal edge 16 of the panel. The preferred embodiment of panel connecting member 15 comprises a double keyway interlocking portion and provides means for attaching panel 12 to adjacent panels via an interlock in a variety of configurations and shapes. As disclosed herein, a variety of interlocking extruded panel joining members having different shapes are a part of the present invention and allow assembly of the panels 12 and 12' in a variety of configurations, including corner-intersections, T-intersections, cross intersections, and the like.

In the preferred embodiment, panel 12 and the various interlocking panel joining members such as coplanar panel joining member 14 are manufactured by extruding fiberglass-reinforced plastic in a "pultrusion" process which is known in the art. The "pultruded" panels and interlocking members produced by pultrusion provide an extremely light-weight and strong structural system which is also impervious to many types of corrosive substances. Consequently, pultruded fiberglass reinforced plastic panels manufactured in accordance with the present invention provide structural systems superior to extruded from materials such as aluminum and the like. However, it will be appreciated that the present invention may be manufactured by extruding aluminum or other materials and the advantages and features disclosed herein will be similarly achieved.

Turning now to FIG. 2, a more detailed partial cross-section of panel 12 and interlocking panel joining member 14 may be seen. Panel 12 includes a pair of parallel planar outer walls 20, 21 which are joined by at least one reinforcing rib 22 which extends across the thickness of the panel between the walls. In the preferred embodiment, rib 22 is of generally I-shape and connects the walls at right angles. Reinforcing shoulders 23 are integrally formed at each intersection of rib 22 with walls 20, 21. Shoulders 23 provide an enlarged cross-section to walls 20, 21 in the vicinity of the intersection with rib 22. The shoulders contribute significantly to the unusual structural strength of the panel and allow use of the structural system in applications requiring an extremely high strength-to-weight ratio.

In the preferred embodiment, as shown more clearly in FIG. 1, there are three reinforcing ribs spaced equally along the width of panel 12. A preferred embodiment of panel 12, pultruded from fiberglass reinforced plastic, is about 24 inches wide and about 1½ inches thick, having ribs spaced at about 5–6 inches apart. The wall thickness of the preferred embodiments is about ⅛ inch along the non-reinforced portions and about 5/32 inch at the reinforcing shoulders 23. A fiberglass reinforced plastic panel manufactured in accordance with the present invention has been found to exhibit in the longitudinal direction a tensile strength in excess of 30,000 pounds per square inch, a compressive strength in excess of 20,000 pounds per square inch, a flexural strength in excess of 30,000 pounds per square inch, and has demonstrated abilities to withstand bearing stresses in excess of 35,000 pounds per square inch, interlaminar shears in excess of 3,700 pounds per square inch, and punch shears in excess of 15,000 pounds per square inch.

In the transverse direction along the width, a 24 inch wide fiberglass reinforced plastic pultruded panel has exhibited a tensile strength in excess of 12,500 pounds per square inch, a compressive strength in excess of 15,000 pounds per square inch, and a flexural strength in excess of 17,500 pounds per square inch. The panel of the preferred embodiment of the present invention has additionally demonstrated a longitudinal deflection of but 0.750 inch in the center of an 11 foot long span when loaded with 250 pounds in the center of the span. Consequently, it may be seen and appreciated that the present invention provides unique structural properties heretofore unattainable with similar materials and configurations.

Referring again to FIG. 2, panel 12 defines along its outer longitudinal edge 16 a panel connecting member 15 which provides the means for attaching the longitudinal edge of the panel to other portions of a structure in which the panel is assembled. In the preferred embodiment, panel connecting member 15 is a double keyway interlocking portion. Panel connecting member 15 includes a head portion 30 which extends outwardly from walls 20, 21 and forms an outer longitudinal edge 16 of the panel 12. A neck portion 31 of connecting member 15 joins head portion 30 to walls 20, 21 and thereby defines a pair of keyways 32, 33 which matingly interfit with interlocking lips on various panel joining members. Flange means 34, 35 extend inwardly from each of walls 20, 21 toward the opposite wall and join with neck portion 31 of connecting member 15.

Head portion 30 of connecting member 15 includes on its interior surface a tab 40 which extends inwardly toward walls 20, 21. Tab 40 has a thickness in the direction of panel thickness less than the interior thickness of the head portion 30 and thus divides the interior of the head portion 30 and defines with the interior surface of head portion 30 a pair of opposed channels 41, 42 for receiving a reinforcing cable (See FIGS. 9, 10). Preferably, tab 40 should extend sufficiently into the interior of head portion 30 so that channels 41, 42 have sufficient circumferential surface area to frictionally grip a reinforcing cable which has been inserted longitudinally through the channels. In the preferred embodiment, channels 41, 42 are of a size sufficient to allow the insertion therethrough of a ¼ inch steel cable.

Advantageously, tab 40 provides a thickened portion of the outer edge of connecting member 15 which permits attachment or affixation of other structural system components such as screws, bolts and the like. In the preferred embodiment, tab 40 is of sufficient thickness to allow drilling and tapping for a ¼–20 threaded screw or bolt. The panel of the preferred embodiment has demonstrated that a ¼–20 bolt drilled and tapped into tab 40 can withstand a pulling torque of up to about 1,250 pounds.

Formed along the outer longitudinal edge 16 of connecting member 15 disposed away from walls 20, 21 is an indentation 43 for receiving a sealing member 44 when panel 12 is assembled in a structure. Sealing member 44 in the preferred embodiment is an elastic or rubber O-ring gasket which seats itself firmly in indentation 43 when compressed. It will be appreciated that a structural system which includes sealing members 44 at each junction between panel 12 and an interlocking panel joining member such as member 14 will be substantially water- or fluid-tight.

On the interior surface of walls 20, 21, at the point of intersection between flanges 34, 35 with the interior surfaces of the walls, are formed additional reinforcing shoulders 37, 38. Shoulders 37, 38 provide additional resistance to interlaminar shear and compressive forces and further provide a solid base along walls 20, 21 upon which flanges 34, 35 may be affixed.

Also shown in FIG. 2 is an H-shaped coplanar interlocking panel joining member 14 which is used to join two panels 12 and 12' in an end-to-end configuration in the same plane. The preferred embodiment of coplanar joining member 14 has a pair of parallel planar outer side members 50, 51 which are connected by a bar member 52 which joins side members 50, 51 orthogonally and intermediate the outer ends of the side members. Each of side members 50, 51 includes on its outer opposite ends an inwardly extending interlocking lip 53 having a dimension A slightly smaller than the length of neck portion 31 of panel 12. It will be appreciated that the interlocking lips 53 of coplanar joining member 14 matingly interfit with keyways 32, 33 of a panel 12, and allow slidable engagement there-between.

It may be observed in FIG. 2 that the thickness (dimension B) of the longitudinal edge 16 of head portion 30 of panel 12 is less than the overall thickness (dimension C) of panel 12 between walls 20, 21. Thus, when panels 12 and 12' are joined by coplanar joining member 14, the outer surface of panel 12 between longitudinal edges is flush with the outer surface of side members 50, 51 of coplanar joining member 14. It will be appreciated that the flush outer surfaces present an aesthetically pleasing structural assembly and contribute to the unique features of the structural system of the present invention.

As stated above, the structural system of the present invention includes several structural components which may be used to assemble the structural panels 12 into a variety of configurations. Also, certain applications of the system may call for the use of decorative trim in order to improve the appearance of the functional portions of the system. FIG. 3 shows C-shaped integrally formed interlocking panel end trim member 60 which matingly interfits with panel connecting member 15 of panel 12 and provides an attractive coverting for the panel connecting member. The panel end trim member 60 covers the head portion 30 and neck portion 31 and includes a pair of parallel planar outer side members 61, 62 which extend orthogonally from the ends of wall member 63. The ends of side members 61, 62 each include an inwardly extending interlocking lip 64, 65 which interfits within keyways 32, 33 of panel 12.

An interlocking panel joining corner member 70 is shown in FIG. 4 and may be used for joining the outer edge of a panel 12 to the outer edge of an orthogonally adjacent panel 12' in a structural system. Corner member 70 generally comprises a square tubular member 68 which has a pair of C-shaped members 60a, 60b extending at right angles from adjacent sides. In the preferred embodiment, C-shaped members 60a, 60b include the elements of panel end trim member 60 (FIG. 3) and are integrally extruded or pultruded together with tubular member 68.

More particularly described, corner member 70 includes a first wall member 71 which has an interlocking lip 72 which interfits with keyway 32 of panel 12. A second wall member 73 is formed at the end of wall member 71 opposite lip 72 and extends at right angles to form together with first wall member 71 the outer surface of a structure which includes panels 12 and 12'. Second wall member 73 also includes an interlocking lip 74. A third wall member 75 parallel to the first wall member 71 extends at right angles from and intermediate the ends of second wall member 73 and intersects with a fourth wall member 76 which extends at right angles from first wall member 71 intermediate the ends thereof. Wall members 75, 76 meet at an orthogonal intersection 77. A fifth wall member 78 is formed parallel and opposite to the first wall member 71 and includes an interlocking lip 79 for matingly interfitting with panel 12. Finally, a sixth wall member 80 parallel to and opposite the second wall member 73 extends at right angles from wall members 75 and 78 and includes an interlocking lip 81 for interfitting with panel 12'.

FIG. 5 shows an interlocking angular panel joining member 90 which may be used to join a pair of panels 12, 12' at an angle other than 90 degrees. Angular panel joining member 90 generally comprises a pair of C-shaped members 60c, 60d which are connected at one corner at an angular intersection 96. Side member 61c of C-shaped member 60c includes an extension 104 which extends at right angles to wall member 63c of C-shaped member 60c opposite intersection 96. Side member 61d of C-shaped member 60d likewise includes an extension 93 which extends at right angles to wall member 63d of C-shaped member 60d, opposite intersection 96, and intersects with extension 104 at an obtuse intersection 106.

More particularly described, angular panel joining member 90 includes a first wall member 91 which includes on one end an interlocking lip 92 for interfitting with a panel 12. A second wall member 93 is formed at the end of the first wall member opposite lip 92 at an obtuse angle 106 and together with first wall member 91 forms an outer surface for the panel structure. Second wall member 93 also includes an inwardly extending interlocking lip 94 for interfitting with a second panel 12' in the panel assembly. A third wall member 95 extends inwardly at right angles from intermediate the ends of first wall member 91 and intersects at 96 in an acute angle with a fourth wall member 97 which extends at right angles from intermediate the ends of the second wall member 93. A fifth wall member 100 opposite and parallel to the first wall member 91 extends at right angles from the third wall member 95 and includes on the end opposite the intersection 96 an interlocking lip 101. Finally, angular panel joining member 90 includes a sixth wall member 102 opposite and parallel to the second wall member 93 which extends at right angles from the fourth wall member 97 and includes an inwardly extending llip 103. Although FIG. 5 shows an angular panel joining member which allows joining two panels at an angle of 45 degrees, it will be understood that the present invention contemplates that panels may be joined at any angle.

FIG. 6 discloses an interlocking integrally formed T-intersection panel joining member 110 which may be used in a structural system for joining three panels 12, 12', 12" in an essentially T-shaped intersection. The T-intersection panel joining member 110 generally comprises an H-shaped member 14a which includes the elements of panel joining member 14 (FIG. 2), with a C-shaped member 60e formed at a right angle on one side member of H-shaped member 14a.

More particularly described, T-intersection member 110 comprises a first wall member 112 which includes on opposite ends inwardly extending interlocking lips 113, 114 for interfitting within the keyways of panels 12 and 12'. A second wall member 115 joins the first wall member 112 at a right angle intermediate the ends thereof to a third wall member 120 which is parallel to the first wall member. At each end of the third wall member 120 is formed fourth wall member 121 and a fifth wall member 122, respectively, of generally L-shape which are parallel to the second wall member 115. The fourth and fifth wall members 121, 122 include inwardly extending interlocking lips 123, 124 opposite lips 113, 114 for interlocking with panels 12 and 12', respectively. L-shaped fourth and fifth wall members 121, 122 further include inwardly extending interlocking lips 125, 126 opposite to each other which mate with the third structural panel 12".

FIG. 7 shows an interlocking integrally formed panel cross joining member 130 which may be used in a structural system to join four panels in a cross intersection. The panel cross joining member 130 includes a first member 131 of generally H-shape having a pair of parallel opposite side walls 132,133 joined by a cross wall 134 intermediate the ends of the side walls. At the ends of each of side walls 132,133 are formed L-shaped members 135, 136, 137, and 138. Each of the L-shaped members includes a first leg 140, 141, 142, 143 parallel to the cross wall 134, and a second leg 144, 145, 146, 147 parallel to the side walls 132,133 of the first member 131. The second legs 144–147 extend inwardly parallel to side walls 132, 133 and form interlocking lips which interfit with panels 12′ and 12″. Each leg of L-shaped members 135–138 has a thickness which permits interfitting within the keyways of panel connecting member 15 of the panels to which the cross joining member is assembled. At the ends of L-shaped members 135–138 opposite the second leg, the first legs 140–143 extend inwardly beyond the point of attachment with the first member 131 so to form an interlocking lips 150, 151, 152, 153 which interfit with the keyways of panels 12 and 12‴.

It will be appreciated and understood that the structural systems shown in FIG. 1 through FIG. 7 contemplate a slidable engagement between the panels and the panel joining members along the outer longitudinal edges of the panels. In some applications, however, it may be impractical or infeasible to slidably engage the panels to the panel joining members in order to assemble a structure. Consequently, FIG. 8 shows a bolted interlocking coplanar joining member 160 which may be used to join a pair of panels 12, 12′ in a coplanar end-to-end configuration, similar to that accomplished by panel joining member 14 described above, without having a slidable engagement. The bolted joining member 160 includes a first outer side member 161 which has a generally Greek letter "pi"-shape. The first outer side member 161 has an outer wall 162, at the ends of which are formed interlocking lips 163, 164 for interfitting with the keyways of panels 12 and 12′. A pair of parallel bar members 165, 166 extend at right angles from the outer wall 162 on the same side as lips 163, 164, intermediate the ends of the outer wall 162.

Bolted joining member 160 further includes a separate second outer side member 170 which is mounted parallel to the first outer side member 161 and includes on each opposite end thereof interlocking lips 171, 172 for interfitting with the keyways of panels 12 and 12′ opposite the keyways which receive lips 163, 164. Coaxial apertures 173, 174 for receiving fastening means 175, such as a bolt, rivet, screw, or the like, are formed intermediate the ends of outer side members 161, 170. Thus, it will be appreciated that bolted joining member 160 may be used in applications in which it is desirable to assemble a structural system without slidably engaging the panel with the panel joining member.

FIG. 9 shows a panel end trim member 180 substantially similar to the panel end trim member 60 (shown in FIG. 3) except that bar member 63′ includes in extension 185 which extends beyond the end of wall member 61′ and thereby provides a surface to which accessories may be bolted, screwed, or otherwise attached. FIG. 9 also shows a pair of reinforcing cable members 181, 182 which are received in channels 41, 42 of panel 12. Cables 181, 182 may be steel or other suitable reinforcing cable, or alternatively may be electrical cables for carrying electrical current.

FIG. 10 shows how a plurality of panels 12a–12f may be joined together by reinforcing cables in a stacking fashion. Panels 12a–12c are joined longitudinal edge-to-edge by panel joining members 14a and 14b. Panels 12d–12f are similarly joined longitudinal edge-to-edge by panel joining members 14c and 14d. The panel assemblies of 12a–12c and 12d–12f are then stacked by aligning the assemblies on the transverse edges of the panels along the width of the panels (not shown). Cables 181, 182 are then serpentined through the opposed channels 41, 42 (not shown in FIG. 10), and joined at a pair of turnbuckles 183, 184 which may be used to tighten the cables.

FIG. 11 shows an edge insert 190 which is formed of an outer wall 191 and a pair of inner ledges 192, 193 which are inwardly offset from the outer surfaces so as to interfit with the transverse edge of a panel or with an edge of a panel 12 which has been longitudinally cut so as to remove a portion thereof. The edge insert 190 may be placed along the width of a panel, if appropriate notches are cut to receive the ribs of the panel. Also shown in FIG. 11 is a pair of flat heater strips 194, 195 which may be attached to the interior walls of a panel so as to provide temperature control of a structure made with the system. The heater strips may be attached to run longitudinally along any wall of the panel. It will also be understood that cooling coils (not shown) may be placed within the hollow portions of the panel so as to provide cooling capability.

FIG. 12 shows an interlocking edge insert 200 having essentially the same outer shape as the panel connecting member 15′ of a panel. The interlocking edge insert 200 includes a head portion 30′ and a neck portion 31′ (together forming a panel connecting member 15′), a pair of keyways 32′, 33′, an inwardly extending tab 40′, and a pair of opposed channels 41′, 42′, all of the same dimensions as in panel 12. A pair of recessed extending ledges 201, 202 extend outwardly away from the panel connecting member 15′ and interfit with the edge 203 of a panel 12. Thus, it will be appreciated that the interlocking cut edge insert 200 may be used to attach a panel connecting member 15′ to the longitudinal edge of a panel 12 which has had a portion cut away so as to provide a transverse width less than the width of a complete panel. It will also be appreciated that insert 200 may be used along the transverse width of a panel if appropriate notches are cut to receive the ribs of the panel.

FIG. 13 shows a C-shaped edge panel end insert member 210 which may be used to attach an interlocking C-shaped portion to the transverse edge of a panel or to the edge of a panel which has been longitudinally cut. The C-shaped insert member 210 generally comprises a C-shaped member 60f substantially similar to the shape shown in FIG. 3, which is integrally connected to an edge insert portion 190a similar to edge insert 190 shown in FIG. 11. The C-shaped insert member 210 further comprises a pair of inner ledges 212, 213 which are inwardly offset from the outer surfaces of C-shaped portion 60f so as to interfit with an edge 214 of a panel 12.

FIG. 14 shows a rounded corner edge panel end insert member 220 which may be used to join the edge of a panel 12 to the edge of an orthogonally adjacent panel 12′. Rounded corner insert member 220 comprises a quarter-section tubular member 221 which has a pair of edge insert members 190b, 190c extending at right angles from adjacent sides of tubular member 221. Edge insert members 190b, 190c include the elements of edge insert member 190 shown in FIG. 11 and are integrally extruded or pultruded together with quarter-section tubular member 221. It will be appreciated that a lower edge insert member such as shown in FIG. 14 may be used to form an upper surface or ceiling for a construction by placing the insert member, notched to receive the panel ribs, along the transverse width of the panels in the construction.

More particularly described, rounded edge panel insert member 220 includes a first wall member 222 which has ledges 223, 224 which are inwardly offset so as to interfit with edges 225, 226 of panel 12. A second wall member 227 is formed at a right angle to first wall member 222 at an intersection 233 and also includes a pair of ledges 228, 229 which are inwardly offset so as to interfit with edges 230, 231 of panel 12'. A rounded wall member 232 joins first wall member 222 and second wall member 227 opposite intersection 233 where first wall member 222 and second wall member 227 meet.

FIG. 15 shows an angled corner edge panel end insert member 240 which may be used to join at an angle other than 90° a pair of panels 12, 12'. Angled corner insert member 240 generally comprises a pair of edge inserts 190d, 190e which include all the elements of edge insert 190 shown in FIG. 11. Edge inserts 190d, 190e are joined at an angled intersection 241. Edge insert member 190d includes an extension 242 which extends at right angles to edge insert member 190d opposite intersection 241. Edge insert member 190e likewise includes an extension 243 which extends at right angles opposite intersection 241 and intersects with extension 242 at an obtuse angled intersection 244. Edge insert member 190d includes a pair of inner ledges 245, 246 which are inwardly offset so as to interfit with the edge of a panel 12. Similarly, edge insert member 190e includes a pair of ledges 247, 248 which are inwardly offset so as to interfit with the edges of a panel 12'.

FIG. 16 shows a rounded angled corner edge panel end insert member 250 substantially similar to the angled corner edge panel end insert member shown in FIG. 15, except that the edge insert portions are joined by a rounded edge as opposed to an angled edge. The rounded angled panel end insert member 250 comprises a pair of edge insert members 190f, 190g which include all the elements of edge insert 190 shown in FIG. 11 and which are joined at an angled intersection 251. A rounded wall member 252 joins edge insert members 190f, 190g opposite intersection 251 and forms a rounded outer wall surface. Cut edge insert member 190f includes a pair of inner ledges 253, 254 which interfit with an edge of a panel 12, and edge insert member 190g likewise includes a pair of ledges 255, 256 which interfit with the edge of a panel 12'. Although FIGS. 15 and 16 show angled corner edge panel insert members which allow joining two panels at an angle of 45 degrees, it will be understood that the present invention contemplates that panels may be joined at any angle.

FIG. 17 shows an edge panel insert cross joining member 260 which may be used to join the edges of four panels 12, 12', 12'', 12''' in a cross intersection. The edge cross joining member 260 includes an H-member 261 having a pair of parallel opposite side walls 262, 263 joined by a cross wall 264 intermediate the ends of the side walls. An edge insert member 190h having a pair of ledges 265, 266 for interfitting with an edge of a panel 12 is formed on the outer surface of side wall 262. Similarly, a edge insert member 190i having a pair of ledges 267, 268 is formed on the outer surface of side wall 263 for interfitting with the edge of a panel 12'''. Edge insert members 190h, 190i include all the elements of edge insert 190 shown in FIG. 11. The edges of panels 12' and 12'' overlap and interfit with opposite ends, respectively, of side walls 262, 263.

FIG. 18 shows a T-intersection edge panel insert member 270 which may be used for joining the edges of three panels 12, 12', 12'' in an essentially T-shaped intersection. The T-intersection edge insert member 270 generally comprises an H-shaped member 271 having a pair of parallel opposite side walls 272, 273 joined by a cross wall 274 intermediate the ends of the side walls. An edge panel end insert member 190j having the elements of edge insert 190 shown in FIG. 11 is formed along the outer surface of side wall 273 and includes a pair of ledges 275, 276 which are inwardly offset so as to interfit with the edge of a panel 12'. Ledges 277, 278 are formed on opposite ends of side wall member 272 so as to interfit with the edge of panels 12 and 12' respectively.

FIG. 19 shows a double edge panel end insert member which may be used to join the edges of two panels 12, 12' in a coplanar end-to-end configuration. The double edge insert member 280 has a pair of parallel planar outer side members 281, 282 which are connected by a bar member 283 which joins side members 281, 282 orthogonally and intermediate the outer ends of the side members. Side members 281, 282 include offset ledges 284, 285 which interfit with the edge of panel 12, and ledges 286, 287 which interfit with the edge of a panel 12'.

FIG. 20 shows a square corner edge panel end insert member 290 which may be used for joining the edge of a panel 12 to the edge of an orthogonally adjacent panel 12'. Square corner edge panel end insert member 290 generally comprises a square tubular member 291 which has a pair of edge panel end insert members 190k, 190l extending at right angles from adjacent sides. Edge panel end insert members 190k, 190l include the elements of edge panel end insert 190 shown in FIG. 11. Panel end insert member 190k interfits with the edge of a panel 12' while panel end insert member 190l interfits with an edge of a panel 12.

FIG. 21 shows a double lip edge panel end insert member 300 which may be used to interfit with the cut edge of a panel 12 so as to provide a surface to which accessories may be bolted, screwed, or otherwise attached. Double lip insert member 300 comprises a planar wall member 301 and a pair of orthogonally extending ledges 302, 303 which interfit with the edge of panel 12.

FIG. 22 shows a bolted edge panel joining member 310 which may be used to join in a coplanar end-to-end configuration a pair of panels 12, 12'. The function accomplished by bolted cut edge joining member 310 is similar to that accomplished by interlocking coplanar member 160 shown in FIG. 8. The bolted edge joining member 310 includes a first outer side member 312 which has a generally Greek letter "pi"-shape. The first outer side member 312 has an outer wall 313 and a pair of parallel bar members 314, 315 which extend at right angles from one side of outer wall 313 intermediate the ends of the outer wall. Bolted edge joining member 310 further includes a separate second outer side member 316 which has a insert portion 317 which interfits between parallel bar members 314, 315. Coaxial apertures 318, 319 for receiving fastening means 320 such as a bolt, rivet, screw, or the like, are formed intermediate the ends of outer side members 312, 316. Thus, it will be appreciated that bolted edge joining member 310 may be used in applications in which it is desirable to assemble a structural system without slidably engaging the panel with any panel joining members.

FIG. 23 shows a double panel window mullion member 330 which may be used to mount a pair of planes of glass 331, 332 in a structural system by mounting atop a panel or along a longitudinal edge of a panel. Window mullion member 330 includes a pair of opposite side walls 333, 334 which are separated by a distance greater than the thickness of a panel 12 so that the window mullion member 330 may straddle the overall thickness of a panel such as shown by dimension C in FIG. 2. It will be appreciated that window mullion member 330 may be used as either a mullion, a header, or a sill for supporting panes of glass or other panels in a construction by simply placing the window mullion member across the overall thickness of a panel or across a cut edge of a panel.

FIG. 24 shows a hinge edge panel end insert member 340 which may be used to attach a hinge to the cut edge of a panel 12. Hinge edge panel end insert member 340 generally comprises an edge panel end insert member 190m having the elements of edge panel end insert 190 shown in FIG. 11, which interfits with the edge of a panel 12. The hinge edge member 340 further includes hinge means 341 formed integrally with edge panel end insert member 190m.

It will be understood and appreciated that the panel accessory members shown in FIGS. 11-24 may be used along the transverse width of panels, if notches are cut for the ribs of the panels, or along the longitudinal edges of panels which have had a portion cut away so as to provide a transverse width less than the width of a complete panel. It will be further understood and appreciated that the panel accessory members may be combined as desired to create structural assemblies of many different shapes, configurations, and sizes. For example, entire enclosed structures having walls, floors, ceilings, a roof, doors, and windows may be assembled by combining the various disclosed accessories with the disclosed structural panel.

FIG. 25 shows a hinge interlocking panel end member 350 which includes an interlocking panel end member 60g having all the elements of panel end trim member 60 shown in FIG. 3 and further includes hinge means 351 which may be used to attach a panel connecting member 15' of a panel 12 to a pivoting hinge mechanism so that a door may be formed in a structure.

The preferred embodiment of the present invention has been disclosed by way of example and it will be understood that other modifications may occur to those skilled in the art without departing from the scope and the spirit of the appended claims.

What is claimed is:

1. A structural panel having a thickness of a first dimension, comprising:
   a pair of parallel planar outer wall members whose outer surfaces are separated by said first dimension;
   at least one reinforcing rib of generally I-shape joining said pair of wall members;
   reinforcing shoulder means formed at each intersection of a surface of said rib with a surface of one of said pair of wall members for imparting rigidity to said panel;
   flange means formed along the longitudinal edges of said wall members and extending inwardly from each of said wall members toward the opposite wall member; and
   at least one panel connecting member for joining said panel to an adjacent panel, said connecting member extending outwardly from said flange means and forming an outer longitudinal edge of said panel and including
   a neck portion extending outwardly from said flange means and between said wall member, and
   a head portion attached to said neck portion and having a thickness of a second dimension less than said first dimension,
   said head portion including on the interior surface of said head portion opposite said wall members an inwardly extending tab, said dividing the interior of said head portion into a pair of equally shaped opposed channels for receiving therein elongate reinforcing cable means, and further comprising second reinforcing shoulder means formed at each intersection of a surface of said flange means with a surface of one of said pair of said wall members.

* * * * *